US010968978B2

(12) United States Patent
Uehara (10) Patent No.: US 10,968,978 B2
(45) Date of Patent: Apr. 6, 2021

(54) DAMPER DEVICE

(71) Applicant: EXEDY Corporation, Neyagawa (JP)

(72) Inventor: Hiroshi Uehara, Neyagawa (JP)

(73) Assignee: EXEDY CORPORATION, Neyagawa (JP)

(*) Notice: Subject to any disclaimer, the term of this patent is extended or adjusted under 35 U.S.C. 154(b) by 0 days.

(21) Appl. No.: 16/703,217

(22) Filed: Dec. 4, 2019

(65) Prior Publication Data
US 2020/0248779 A1    Aug. 6, 2020

(30) Foreign Application Priority Data

Feb. 5, 2019 (JP) .............................. JP2019-018510

(51) Int. Cl.
*F16F 15/10* (2006.01)
*F16F 15/22* (2006.01)
(Continued)

(52) U.S. Cl.
CPC .............. *F16F 15/36* (2013.01); *F16D 13/38* (2013.01); *F16F 15/1292* (2013.01);
(Continued)

(58) Field of Classification Search
CPC ...... F16F 15/12; F16F 15/1213; F16F 15/129; F16F 15/1292; F16F 15/1295;
(Continued)

(56) References Cited

U.S. PATENT DOCUMENTS 4,406,357 A * 9/1983 Nagano ................. F16F 15/129
192/213.31
4,585,428 A * 4/1986 Asada ................... F16F 15/129
192/204
(Continued)

FOREIGN PATENT DOCUMENTS

JP     2014-070713 A     4/2014

OTHER PUBLICATIONS

Extended European Patent Application of the corresponding European Application No. 20153503.6, dated Jul. 13, 2020, 9 pages.

*Primary Examiner* — Adam D Rogers
(74) *Attorney, Agent, or Firm* — United IP Counselors, LLC (57) ABSTRACT

The present damper device includes a large hysteresis mechanism, generating a large hysteresis torque, and a hysteresis inhibiting mechanism. In a positive-side torsional region, when relative rotation is performed until reaching a maximum torsion angle from a neutral position, the hysteresis inhibiting mechanism deactivates the large hysteresis mechanism until the relative rotation reaches a first torsion angle from the neutral position, but activates the large hysteresis mechanism until the relative rotation reaches the maximum torsion angle from the first torsion angle; and when the relative rotation is performed until reaching the neutral position from the maximum torsion angle, the hysteresis inhibiting mechanism deactivates the large hysteresis mechanism until the relative rotation reaches a second torsion angle less than the first torsion angle from the (Continued)

maximum torsion angle, but activates the large hysteresis mechanism until the relative rotation reaches the neutral position from the second torsion angle.

12 Claims, 10 Drawing Sheets

(51) Int. Cl.
| | |
|---|---|
| *F16F 15/30* | (2006.01) |
| *F16D 13/22* | (2006.01) |
| *F16F 15/36* | (2006.01) |
| *F16D 13/38* | (2006.01) |
| *F16F 15/31* | (2006.01) |
| *F16F 15/129* | (2006.01) |
| *F16F 15/139* | (2006.01) |
| *F16F 15/121* | (2006.01) |
| *F16F 15/134* | (2006.01) |

(52) U.S. Cl.
CPC ........ *F16F 15/1295* (2013.01); *F16F 15/139* (2013.01); *F16F 15/31* (2013.01); *F16F 15/1213* (2013.01); *F16F 15/1343* (2013.01)

(58) Field of Classification Search
CPC .. F16F 15/30; F16F 15/31; F16F 15/36; F16F 15/1343; F16F 15/139; F16D 13/38
See application file for complete search history.

(56) References Cited

U.S. PATENT DOCUMENTS

| | | | | |
|---|---|---|---|---|
| 4,614,261 | A * | 9/1986 | Takeuchi | F16F 15/12353 192/201 |
| 4,645,053 | A | 2/1987 | Kitayama | |
| 5,205,389 | A | 4/1993 | Raab et al. | |
| 6,270,417 | B1 * | 8/2001 | Hashimoto | F16F 15/129 192/213.22 |
| 6,659,876 | B2 * | 12/2003 | Hashimoto | F16F 15/129 192/213.22 |
| 6,837,354 | B2 * | 1/2005 | Uehara | F16F 15/1238 192/213.22 |
| 10,203,019 | B2 * | 2/2019 | Nasu | F16F 15/129 |
| 10,570,986 | B2 * | 2/2020 | Lebas | F16F 15/145 |
| 10,781,882 | B2 * | 9/2020 | Sekine | F16F 15/1232 |
| 2007/0191120 | A1 | 8/2007 | Saeki et al. | |
| 2017/0363150 | A1 | 12/2017 | Buhl | |

* cited by examiner

DAMPER DEVICE

CROSS-REFERENCE TO RELATED APPLICATIONS

This application claims priority to Japanese Patent Application No. 2019-018510, filed Feb. 5, 2019. The contents of that application are incorporated by reference herein in their entirety.

TECHNICAL FIELD

The present invention relates to a damper device for a vehicle.

BACKGROUND ART

A damper device described in Japan Laid-open Patent Application Publication No. 2014-70713 has been proposed as a damper device used for a hybrid vehicle. The damper device is disposed between an engine and a drive unit in which an electric motor is installed, and includes a small hysteresis mechanism and a large hysteresis mechanism.

Additionally, in the damper device, a small hysteresis torque is constantly generated in a positive-side torsional region in which a torque is transmitted from the engine side. Because of this, during idling of the engine, for instance, the small hysteresis torque is not switched to a large hysteresis torque, whereby small-amplitude torsional vibration, produced during idling of the engine, can be effectively attenuated by the small hysteresis torque.

A hybrid vehicle, using the engine and the electric motor in combination, is configured to start the engine after increasing the rotational speed of the drive unit by the electric motor. In this engine starting, a torque greatly fluctuates, whereby relative rotation (displacement) occurs between an input-side rotor and an output-side rotor in an angular range between the positive-side maximum torsion angle and the negative-side maximum torsion angle.

In such a situation, in the damper device described in Japan Laid-open Patent Application Publication No. 2014-70713, only the small hysteresis torque is constantly generated in the positive-side torsional region, whereby a stopper mechanism is frequently activated, and besides, a large shock is applied thereto. Because of this, the stopper mechanism becomes likely to be damaged or broken. Additionally, drivability could be impaired depending on the magnitude of the small hysteresis torque.

Moreover, when relative rotation is performed between the input-side rotor and the output-side rotor across a neutral position from the positive-side torsional region to the negative-side torsional region or vice versa, the relative rotation between the both rotors is changed in direction. At this time, in the relative rotation from the positive-side torsional region to the negative-side torsional region or vice versa, a portion contacted by a portion of a given component (e.g., relevant either of end surfaces of a torsion spring) is configured to be switched between a portion (a window portion) of one rotor and that of the other rotor. In such a situation, when only the small hysteresis torque is generated in the positive-side torsional region as described in Japan Laid-open Patent Application Publication No. 2014-70713, large shocks are applied to the contacted portions.

BRIEF SUMMARY

It is an object of the present invention to enable inhibition of damage or breakage of respective portions without impairing drivability, even when large-amplitude torsional vibration is inputted in a positive-side torsional region.

(1) A damper device according to the present invention is a device installed in a vehicle, and transmits a torque from a drive source to an output side therethrough. The damper device includes an input-side rotor, an output-side rotor, a damper part, a first friction mechanism and a friction control mechanism. The output-side rotor is rotatable relative to the input-side rotor. The damper part elastically couples the input-side rotor and the output-side rotor in a rotational direction. The first friction mechanism generates a first hysteresis torque in relative rotation between the input-side rotor and the output-side rotor. The friction control mechanism controls actuation of the first friction mechanism.

Additionally, in a positive-side torsional region in which the torque is transmitted from the drive source, the friction control mechanism actuates the first friction mechanism as follows.

When the relative rotation is performed until reaching a maximum torsion angle from a neutral position without the relative rotation, the friction control mechanism deactivates the first friction mechanism until the relative rotation reaches a first torsion angle from the neutral position, but the friction control mechanism activates the first friction mechanism until the relative rotation reaches the maximum torsion angle from the first torsion angle.

When the relative rotation is performed until reaching the neutral position from the maximum torsion angle, the friction control mechanism deactivates the first friction mechanism until the relative rotation reaches a second torsion angle less than the first torsion angle from the maximum torsion angle, but the friction control mechanism activates the first friction mechanism until the relative rotation reaches the neutral position from the second torsion angle.

In the present device, the first friction mechanism is deactivated until the relative rotation reaches the first torsion angle from the neutral position in the positive-side torsional region. In other words, the first hysteresis torque is not generated in this angular region. Hence, drivability is enhanced. On the other hand, in a region that the relative rotation exceeds the first torsion angle, the first friction mechanism is activated and generates the first hysteresis torque. Because of this, large-amplitude vibration can be inhibited by the first hysteresis torque, without enabling a stopper mechanism to be activated. Besides, even if the stopper mechanism is activated, shock can be inhibited from being applied to the stopper mechanism.

Moreover, when relative rotation (displacement) between the input-side rotor and the output-side rotor is performed until reaching the neutral position from the maximum torsion angle, the first friction mechanism is activated until the relative rotation reaches the neutral position from the second torsion angle. In other words, in this angular region, the first hysteresis torque is generated. Because of this, when the relative rotation is performed from the positive side to a negative side, friction resistance is generated in the vicinity of the neutral position. In other words, shock can be inhibited from being applied to contacted portions of the respective members in switching of the relative rotation from the positive-side torsional region to the negative-side torsional region.

(2) Preferably, a deactivation angular range from the neutral position to the first torsion angle and a deactivation angular range from the maximum torsion angle to the second torsion angle are equal in magnitude. In this case, the configuration of the damper device is made simpler than when two deactivation angular ranges are different in magnitude.

(3) Preferably, each of the deactivation angular ranges is wider than each of an activation angular range from the first torsion angle to the maximum torsion angle and an activation angular range from the second torsion angle to the neutral position. Here, in the positive-side torsional region, the first hysteresis torque is not generated in a wide region. Hence, drivability is further enhanced.

(4) Preferably, the friction control mechanism deactivates the first friction mechanism within a range that fluctuations in the torque transmitted from the drive source correspond to the deactivation angular ranges in an entire angular range between the neutral position and the maximum torsion angle.

(5) Preferably, the damper device further includes a second friction mechanism that generates a second hysteresis torque less than the first hysteresis torque in an entire angular range in which the relative rotation between the input-side rotor and the output-side rotor is performed.

Here, the second hysteresis torque having lesser magnitude is generated in the entirety of the positive-side and negative side torsional regions of the relative rotation between the both rotors. Hence, small-amplitude vibration can be effectively attenuated.

(6) Preferably, in a negative-side torsional region in which a torque is transmitted from the output side, the friction control mechanism actuates the first friction mechanism as follows.

When the relative rotation is performed until reaching a maximum torsion angle from the neutral position, the friction control mechanism deactivates the first friction mechanism until the relative rotation reaches a third torsion angle from the neutral position, but the friction control mechanism activates the first friction mechanism until the relative rotation reaches the maximum torsion angle from the third torsion angle.

When the relative rotation is performed until reaching the neutral position from the maximum torsion angle, the friction control mechanism deactivates the first friction mechanism until the relative rotation reaches a fourth torsion angle greater than the third torsion angle from the maximum torsion angle, but the friction control mechanism activates the first friction mechanism until the relative rotation reaches the neutral position from the fourth torsion angle.

In the present device, when the relative rotation is performed until reaching the maximum torsion angle from the neutral position in the negative-side torsional region, the first hysteresis torque is generated after the relative rotation exceeds the third torsion angle. On the other hand, when the relative rotation is performed until reaching the neutral position from the maximum torsion angle, the first hysteresis torque is generated until the relative rotation reaches the neutral position from the fourth torsion angle greater than the third torsion angle.

In other words, in the negative-side torsional region, overlapping occurs between a region that the first hysteresis torque is generated when the relative rotation is performed until reaching the maximum torsion angle from the neutral position and a region that the first hysteresis torque is generated when the relative rotation is performed to the opposite side. Because of this, the first hysteresis torque is generated in a wide angular range, and large-magnitude vibration inputted from the output side can be effectively attenuated.

(7) Preferably, the drive source is an engine, and an electric motor for starting the engine and driving the vehicle is disposed on the output side.

(8) Preferably, the input-side rotor includes a first plate and a second plate. The first and second plates are disposed in axial opposition to each other at a predetermined interval. The first and second plates are fixed to each other so as to be axially immovable from each other and be non-rotatable relative to each other. Additionally, the output-side rotor includes a flange. The flange is disposed to be interposed between the first and second plates. Moreover, the first friction mechanism is disposed axially between the flange and at least one of the first and second plates.

(9) Preferably, the first friction mechanism includes a friction plate and an urging member. The friction plate is rotated together with the output-side rotor within a predetermined angular range, and is capable of making contact by friction with the input-side rotor. The urging member causes the friction plate and the input-side rotor to be pressed in contact with each other.

(10) Preferably, the friction control mechanism includes a cutout and a contact portion. The cutout is provided in one of the output-side rotor and the friction plate, and extends within a predetermined angular range in a circumferential direction. The contact portion is provided in the other of the output-side rotor and the friction plate, and is disposed in the cutout at a predetermined gap therefrom. Additionally, the friction plate is rotatable relative to the output-side rotor within a range of the predetermined gap.

(11) A damper device according to another aspect of the present invention is installed in a vehicle, and transmits a torque from a drive source to an output side therethrough. The present damper device includes an input-side rotor, an output-side rotor, a damper part and a friction mechanism. The output-side rotor is rotatable relative to the input-side rotor. The damper part elastically couples the input-side rotor and the output-side rotor in a rotational direction. The friction mechanism generates a hysteresis torque in relative rotation between the input-side rotor and the output-side rotor.

Additionally, the friction mechanism includes a small friction mechanism and a large friction mechanism. The small friction mechanism generates a small hysteresis torque. The large friction mechanism generates a large hysteresis torque greater than the small hysteresis torque. In a positive-side torsional region in which the torque is transmitted from the drive source, the small friction mechanism generates the small hysteresis torque within a first angular range in which the relative rotation is performed until reaching a first torsion angle from a neutral position without the relative rotation. In the positive-side torsional region, the large friction mechanism generates the large hysteresis torque greater than the small hysteresis torque within a second angular range, which is narrower than the first angular range and in which the relative rotation is performed until reaching a maximum torsion angle from the first torsion angle.

(12) Preferably, in a negative-side torsional region in which a torque is transmitted from the output side, the small friction mechanism generates the small hysteresis torque within a third angular range in which the relative rotation is performed until reaching a third torsion angle from the neutral position. In the negative-side torsional region in which the torque is transmitted from the output side, the large friction mechanism also generates the large hysteresis torque greater than the small hysteresis torque within a fourth angular range, which is wider than the third angular range and in which the relative rotation is performed until reaching a maximum torsion angle from the third torsion angle.

Overall, according to the present invention described above, damage or breakage of respective portions can be inhibited without impairing drivability, even when large-amplitude torsional vibration is inputted in a positive-side torsional region.

DETAILED DESCRIPTION

[Block Diagram of Vehicle]

Figure 1:
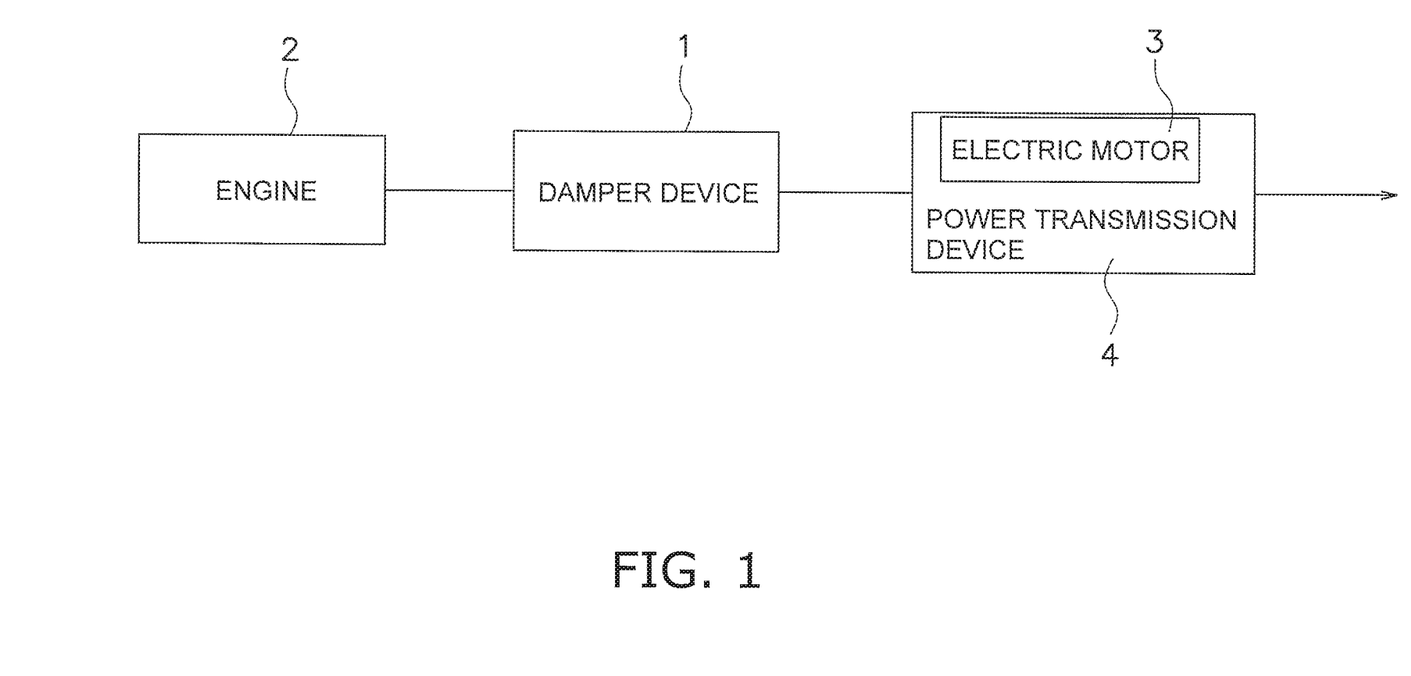
FIG. 1 is a block diagram of a vehicle in which a damper device according to a preferred embodiment of the present invention is installed.
Figure 2:
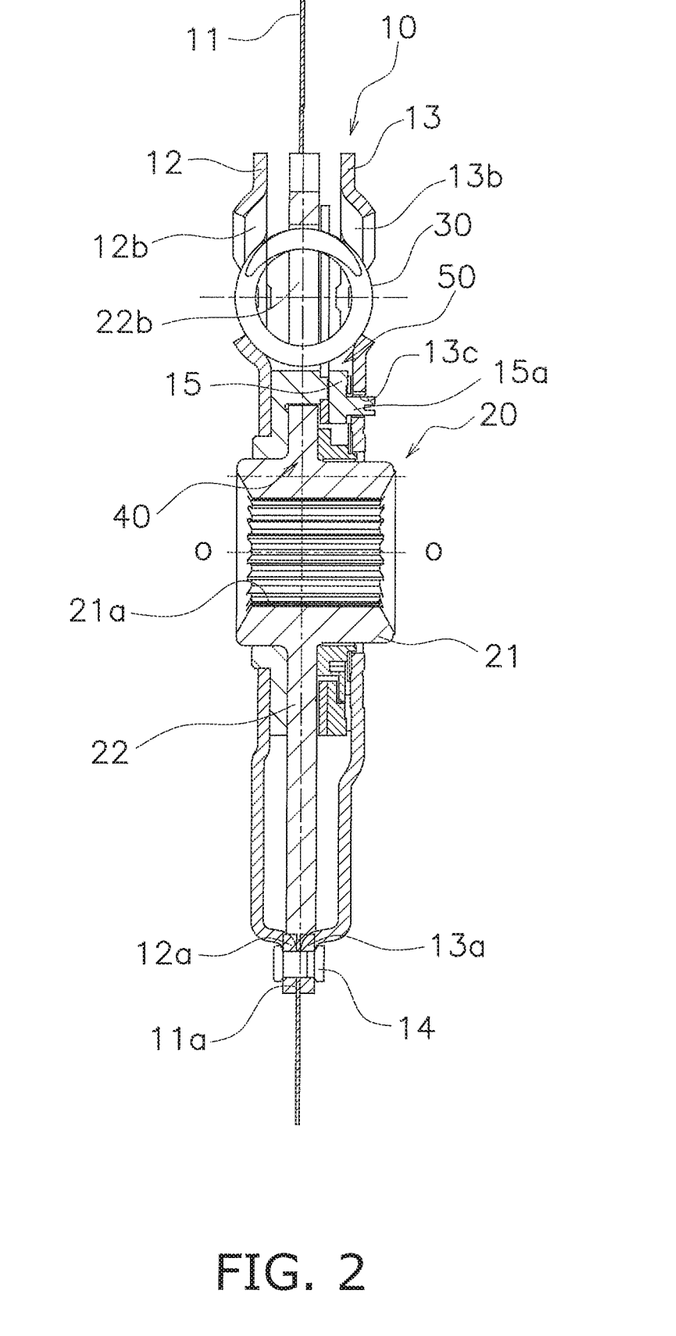
FIG. 2 is a cross-sectional view of the damper device.
Figure 3:
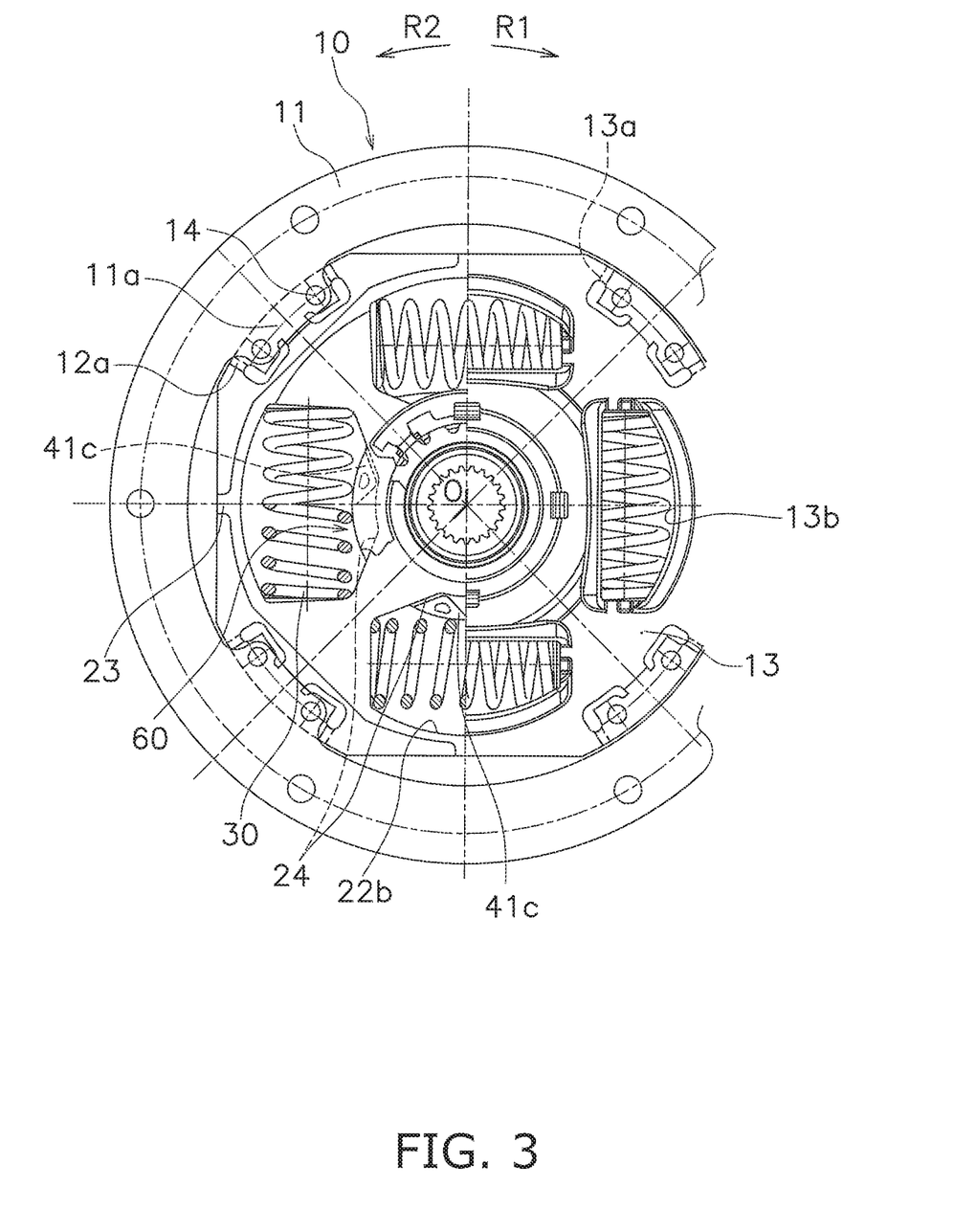
FIG. 3 is a front view of the damper device.

FIG. 1 is a block diagram of a vehicle in which a damper device according to a preferred embodiment of the present invention is installed. On the other hand, FIGS. 2 and 3 are a cross-sectional view and a front view of the damper device, respectively. The present damper device 1 is disposed between an engine 2 provided as a drive source and a power transmission device 4 including an electric motor 3. A torque, transmitted from the engine 2, is transmitted to the power transmission device 4 through the damper device 1, and is further transmitted to a wheel. In FIG. 2, line O-O indicates the rotational axis of the damper device 1.

[Damper Device 1]

The damper device 1 includes an input-side rotor 10, a spline hub 20 (exemplary output-side rotor), a plurality of torsion springs 30 (exemplary damper part), a small hysteresis mechanism 40 (exemplary second friction mechanism), a large hysteresis mechanism 50 (exemplary first friction mechanism) and a hysteresis inhibiting mechanism 60 (exemplary friction control mechanism).

[Input-Side Rotor 10]

The input-side rotor 10 includes a drive plate 11, a clutch plate 12 and a retaining plate 13. These plates 11, 12 and 13 will be hereinafter collectively referred to as "input-side plate 10" on an as-needed basis.

The drive plate 11 has an annular disc shape, and is fixed at the outer peripheral part thereof to an engine-side member (not shown in the drawings). The drive plate 11 is provided with four fixation portions 11a on the inner peripheral edge thereof. The fixation portions 11a are shaped to extend from the inner peripheral edge of the drive plate 11 further radially inward, and each have a predetermined circumferential width. Additionally, the fixation portions 11a are fixed to the clutch plate 12 and the retaining plate 13 (this structure will be described in detail).

The clutch plate 12 and the retaining plate 13, each having an annular disc shape, are disposed in axial opposition to each other. The outer peripheral part of the clutch plate 12 and that of the retaining plate 13 are processed by stamping so as to approach to each other, whereby each plate 12, 13 is provided with four coupling portions 12a, 13a. The coupling portions 12a, 13a are provided in corresponding positions to the fixation portions 11a of the drive plate 11. The circumferential width of each coupling portion 12a, 13a is wider than that of each fixation portion 11a. Additionally, the fixation portions 11a are interposed between pairs of coupling portions 12a and 13a of the clutch plate 12 and the retaining plate 13, respectively, and each triad of portions 11a, 12a and 13a is fixed by rivets 14. Therefore, the clutch plate 12 and the retaining plate 13 are axially immovable relative to each other and are also non-rotatable relative to each other.

Each of the clutch plate 12 and the retaining plate 13 includes four window portions 12b, 13b. The window portions 12b and the window portions 13b are provided in opposed positions. Each window portion 12b, 13b is composed of an axial through hole and a raised portion raised axially outward from the edge of the axial through hole. Additionally, the retaining plate 13 is provided with four engaging holes 13c in the inner peripheral part thereof.

A first bushing 15 is disposed on the clutch plate 12 side of the inner peripheral part of the retaining plate 13. The first bushing 15 is an annular member made of resin, and is provided with four engaging protrusions 15a axially protruding from the retaining plate 13-side surface thereof. The engaging protrusions 15a are engaged with the engaging holes 13c of the retaining plate 13, whereby the first bushing 15 is rotated together with the retaining plate 13.

[Spline Hub 20]

The spline hub 20 includes a boss 21 having a tubular shape and a flange 22 extending radially outward from the outer peripheral surface of the boss 21. The boss 21 is inserted into a center hole of the clutch plate 12 and that of the retaining plate 13. The boss 21 is provided with a spline hole 21a, to which a shaft (not shown in the drawings) of the power transmission device 4 is spline-coupled, in the center part thereof. The flange 22 is disposed axially between the clutch plate 12 and the retaining plate 13. The flange 22 is provided with four window holes 22b in corresponding positions of pairs of window portions 12b and 13b of the clutch plate 12 and the retaining plate 13.

Figure 4:
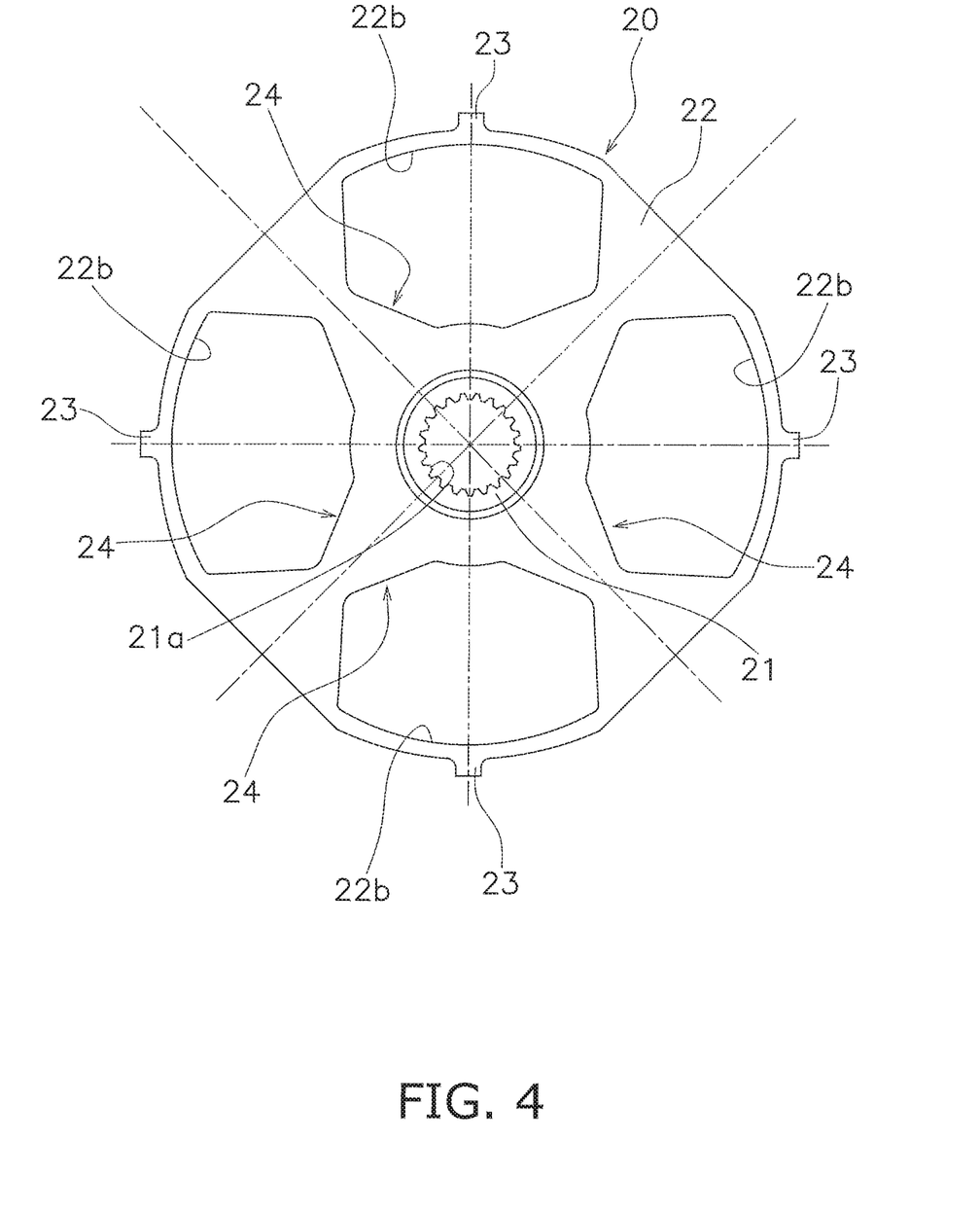
FIG. 4 is a front view of a spline hub.

As shown in FIGS. 3 and 4, the flange 22 is provided with four stopper pawls 23 protruding radially outward from the outer peripheral edge thereof. Each stopper pawl 23 is located in the middle of each window hole 22b in the width direction of each window hole 22b. Moreover, each stopper pawl 23 is located between adjacent two of the fixation portions 11a of the drive plate 11 in the circumferential direction. Furthermore, when the spline hub 20 is rotated relative to the input-side plate 10 at a predetermined angle, the stopper pawls 23 make contact with the pairs of coupling portions 12a and 13a of the clutch plate 12 and the retaining plate 13, respectively. Accordingly, relative rotation between the both members 10 and 20 is stopped. In other words, the coupling portions 12a and 13a and the stopper pawls 23 compose a stopper mechanism that restricts the input-side plate 10 and the spline hub 20 from being rotated relative to each other within a predetermined range.

Besides, each window hole 22b is provided with a cutout 24, having a predetermined width in the circumferential direction, on the inner peripheral edge thereof. The cutout 24 is disposed on the further inner peripheral side of each torsion spring 30 accommodated in each window hole 22b. The cutout 24 is shaped to extend from radially inside to outside.

[Torsion Springs 30]

The torsion springs 30 are accommodated in the window holes 22b of the spline hub 20, respectively, while being supported by pairs of the window portions 12b and 13b of the clutch plate 12 and the retaining plate 13, respectively. Each torsion spring 30 is accommodated without any gaps in each window hole 22b and each pair of window portions 12b and 13b in a free state without being compressed. In other words, each torsion spring 30 makes contact at the both ends thereof with the both wall surfaces of each window hole 22b and those of each pair of window portions 12b and 13b.

[Small Hysteresis Mechanism 40]

The small hysteresis mechanism 40 generates a small hysteresis torque (exemplary second hysteresis torque), the magnitude of which is relatively small, in the entire region of torsion angle that the input-side plate 10 and the spline hub 20 are rotated relative to each other. As shown close-up in FIG. 5, the small hysteresis mechanism 40 includes a first intermediate member 41, a second bushing 42 and a first cone spring 43.

Figure 5:
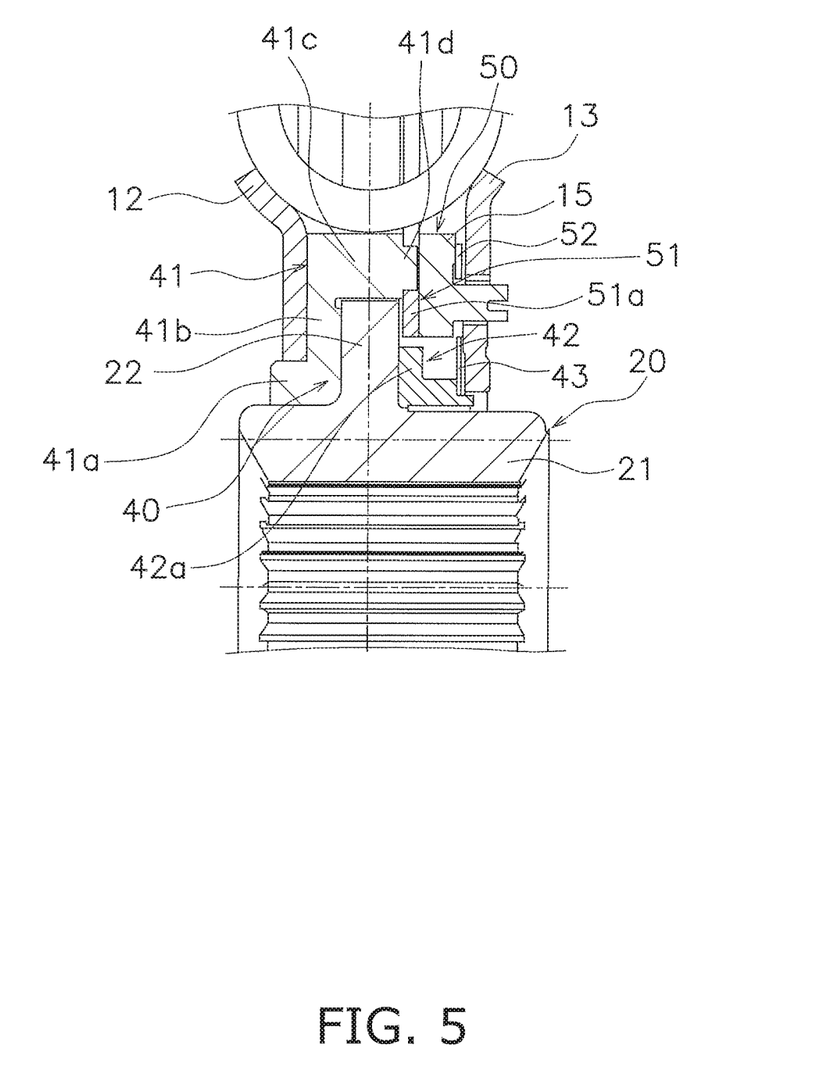
FIG. 5 is a partial enlarged view of FIG. 2.
Figure 6:
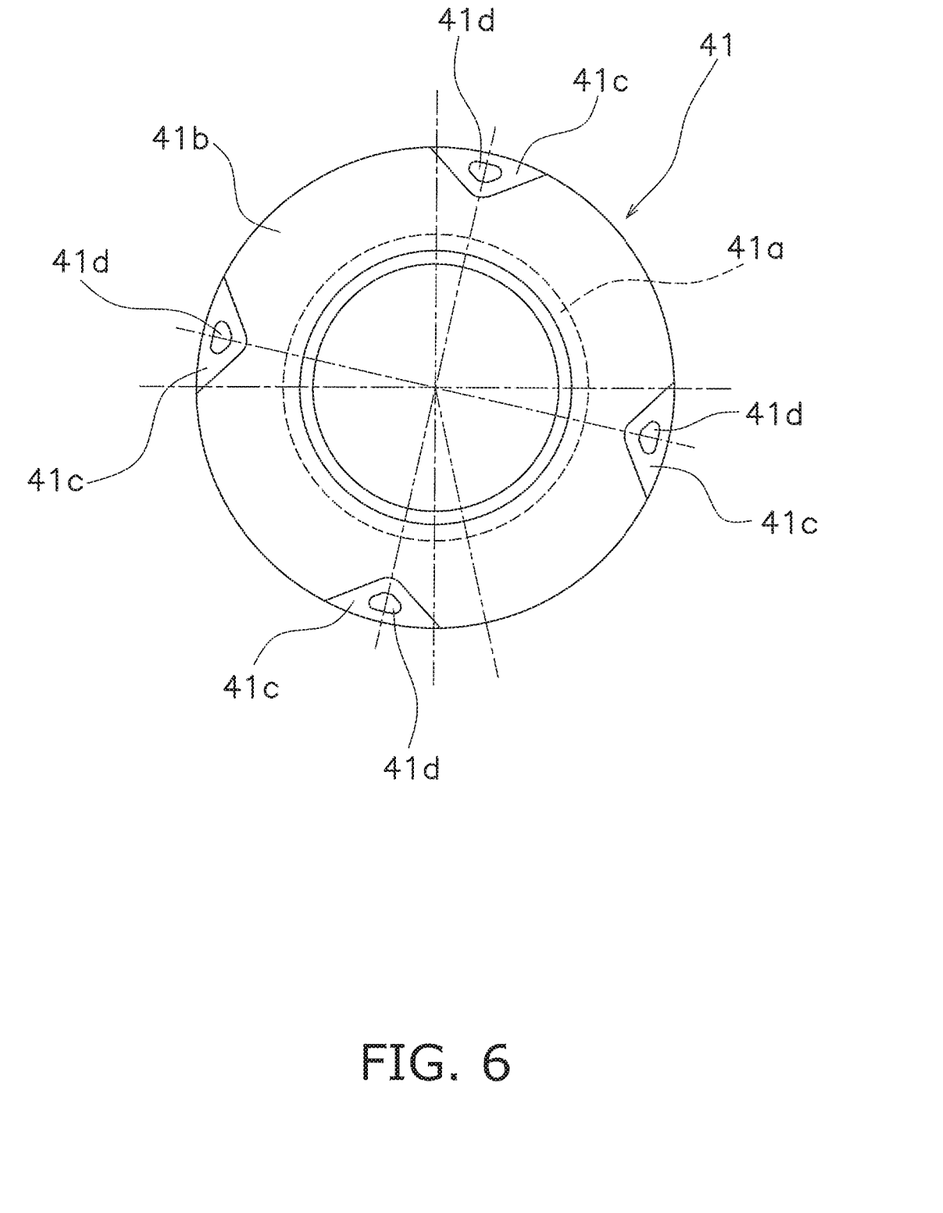
FIG. 6 is a front view of a first intermediate member.

As shown in FIGS. 5 and 6, the first intermediate member 41 is a disc-shaped member and includes a tubular portion 41a, a disc portion 41b, four contact portions 41c and four engaging protrusions 41d. The tubular portion 41a is disposed on the outer peripheral surface of the boss 21 of the spline hub 20. Specifically, the inner peripheral surface of the tubular portion 41a is disposed on the outer peripheral surface of a clutch plate 12-side part of the boss 21. The disc portion 41b is shaped to radially extend from one end of the tubular portion 41a. The disc portion 41b is disposed axially between the inner peripheral part of the clutch plate 12 and the flange 22 of the spline hub 20. Each contact portion 41c is shaped to protrude toward the retaining plate 13 from the outer peripheral part of the disc portion 41b. The contact portions 41c have the same shape. As seen in the front view, each contact portion 41c is made in the shape of a triangle having the apex thereof on the inner peripheral side. The four contact portions 41c are disposed at equal intervals in the circumferential direction. Each engaging protrusion 41d is shaped to protrude further toward the retaining plate 13 from the middle of each contact portion 41c.

The second bushing 42 is disposed on the outer peripheral surface of a retaining plate 13-side part of the boss 21 of the spline hub 20. The second bushing 42 is provided with a friction portion 42a, having a disc shape, on a one-side end thereof. The friction portion 42a is shaped to radially extend from the one-side end of the second bushing 42. The friction portion 42a makes contact at the lateral surface thereof with the flange 22 of the spline hub 20.

The first cone spring 43 is disposed axially between the other-side end of the second bushing 42 and the inner peripheral part of the retaining plate 13. The friction portion 42a of the second bushing 42 is pressed in contact with the flange 22 of the spline hub 20 by the first cone spring 43.

In the configuration described above, the lateral surface of the disc portion 41b of the first intermediate member 41 and that of the flange 22 make contact by friction with each other, whereby a hysteresis torque is generated. On the other hand, the friction portion 42a of the second bushing 42 and the lateral surface of the flange 22 make contact by friction with each other, whereby a hysteresis torque is generated. The small hysteresis torque is obtained by the hysteresis torques described above.

[Large Hysteresis Mechanism 50]

Figure 7:
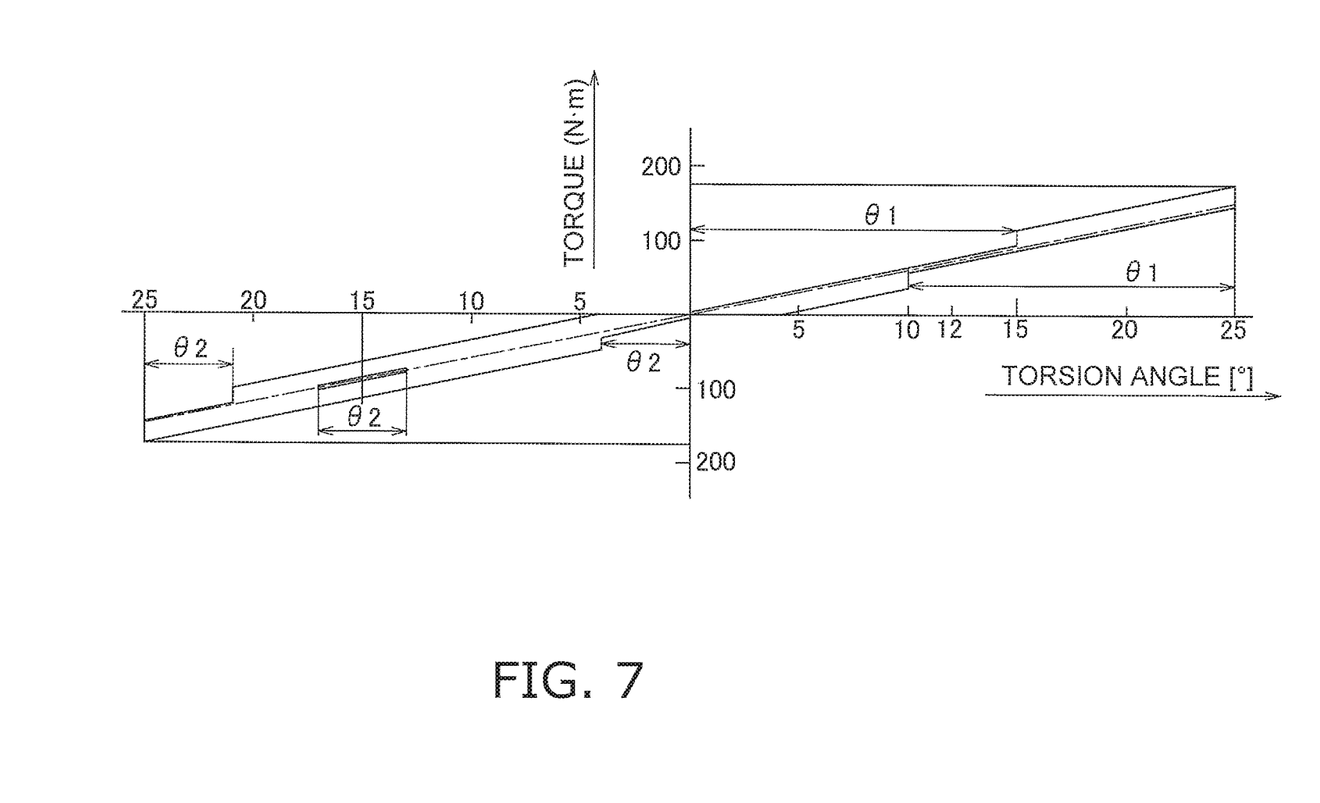
FIG. 7 is a chart showing torsional characteristics of the damper device.

As shown in FIG. 7, the large hysteresis mechanism 50 generates a large hysteresis torque (exemplary first hysteresis torque), the magnitude of which is greater than that of the small hysteresis torque, in the following torsional regions.

(1) When relative rotation is performed between the input-side plate 10 and the spline hub 20 until reaching a maximum torsion angle (25 degrees) from a neutral position (0 degrees) without the relative rotation in a positive-side torsional region, the large hysteresis torque is generated in a torsional region from a first torsion angle (15 degrees) to the maximum torsion angle.

(2) When the relative rotation is performed until reaching the neutral position from the maximum torsion angle in the positive-side torsional region, the large hysteresis torque is generated in a torsional region from a second torsion angle (10 degrees) less than the first torsion angle (15 degrees) to the neutral position.

(3) When the relative rotation is performed until reaching a maximum torsion angle (25 degrees) from the neutral position in a negative-side torsional region, the large hysteresis torque is generated in a torsional region from a third torsion angle (4 degrees) to the maximum torsion angle.

(4) When the relative rotation is performed until reaching the neutral position from the maximum torsion angle in the negative-side torsional region, the large hysteresis torque is generated in a torsional region from a fourth torsion angle (21 degrees) greater than the third torsion angle (4 degrees) to the neutral position.

It should be noted that "the positive-side torsional region" is a region in which the input-side plate 10 and the spline hub 20 are displaced relative to each other when a torque is transmitted from the engine. On the other hand, "the negative-side torsional region" is a region in which the input-side plate 10 and the spline hub 20 are displaced relative to each other in a reverse direction to the displacement in the positive-side torsional region when a torque is transmitted from an output side.

The large hysteresis mechanism 50 includes a second intermediate member 51 and a second cone spring 52.

Figure 8:
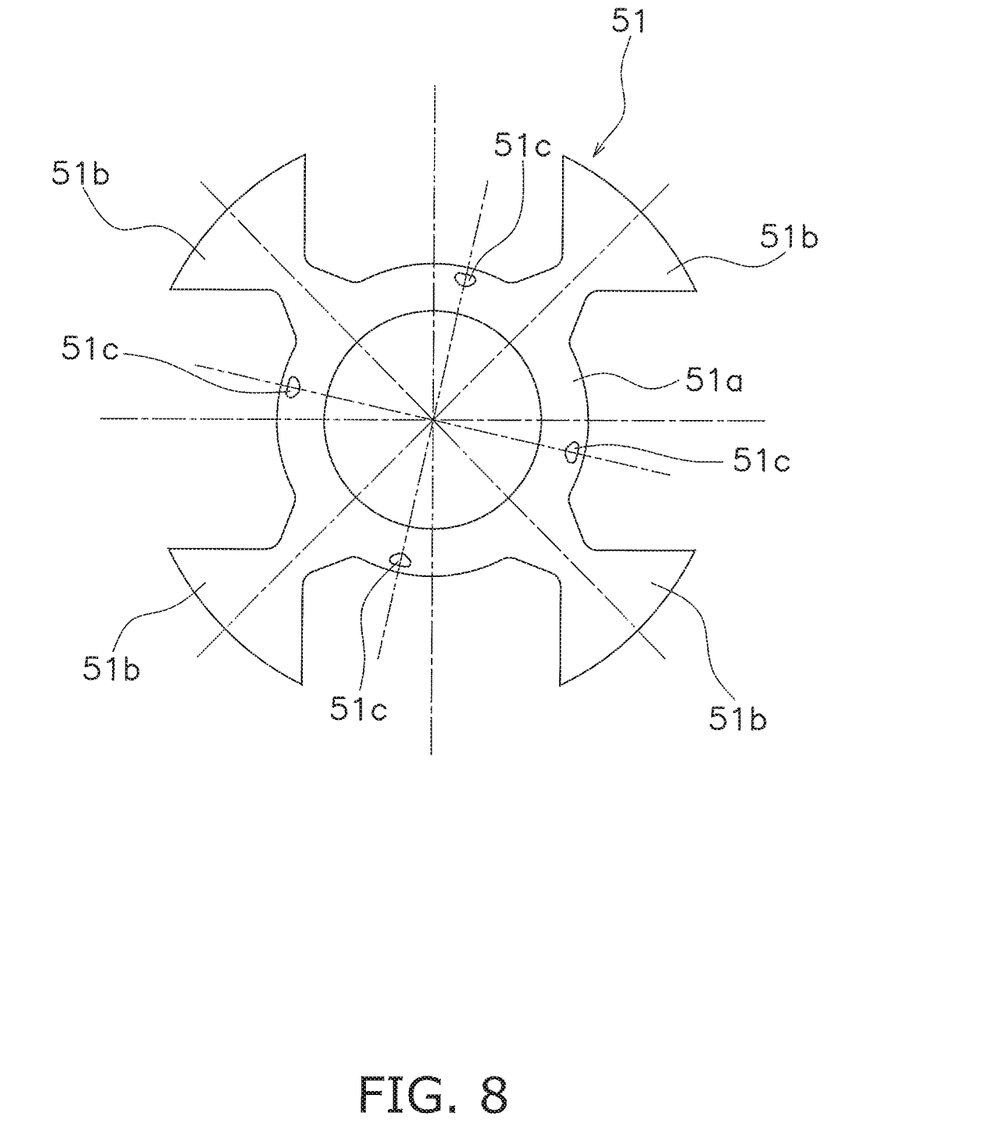
FIG. 8 is a front view of a second intermediate member.

As shown in FIGS. 5 and 8, the second intermediate member 51 includes a disc portion 51a having an annular shape and four support portions 51b protruding radially outward from the disc portion 51a. The disc portion 51a is attached to the contact portions 41c of the first intermediate member 41. In more detail, the disc portion 51a is attached to the distal end surfaces of the contact portions 41c, while four holes 51c, provided in the disc portion 51a, are fitted onto the engaging protrusions 41d provided on the distal ends of the contact portions 41c, respectively. In other words, the second intermediate member 51 is unitarily activated with the first intermediate member 41. Therefore, the first intermediate member 41 and the second intermediate member 51 will be hereinafter referred to as "intermediate member 41, 51" on an as-needed basis. Additionally, each torsion spring 30 is accommodated circumferentially between adjacent two of the four support portions 51b. Each torsion spring 30 herein makes contact at the both ends thereof with the adjacent two of the support portions 51b.

The second cone spring 52 is disposed axially between the first bushing 15 and the inner peripheral part of the retaining plate 13. The second cone spring 52 causes the first bushing 15 to be pressed in contact with the second intermediate member 51, and causes the clutch plate 12 to be pressed in contact with the disc portion 41b of the first intermediate member 41 through the retaining plate 13.

In the configuration described above, the lateral surface of the disc portion 51a of the second intermediate member 51 and that of the first bushing 15 make contact by friction with each other, whereby a hysteresis torque is generated. On the other hand, the lateral surface of the clutch plate 12 and that of the disc portion 41b of the first intermediate member 41 make contact by friction with each other, whereby a hysteresis torque is generated. Here, a friction force (hysteresis torque), generated between the disc portion 41b of the first intermediate member 41 and the clutch plate 12, is configured to be greater than a friction force (part of the small hysteresis torque) generated between the disc portion 41b and the flange 22. The large hysteresis torque, the magnitude of which is greater than that of the small hysteresis torque, is obtained by the hysteresis torques described above.

[Hysteresis Inhibiting Mechanism 60]

The hysteresis inhibiting mechanism 60 deactivates the large hysteresis mechanism 50 in the following torsional regions.

(1) When the relative rotation is performed until reaching the maximum torsion angle (25 degrees) from the neutral position (0 degrees) in the positive-side torsional region, the large hysteresis mechanism 50 is deactivated in a torsional region from the neutral position to the first torsion angle (15 degrees).

(2) When the relative rotation is performed until reaching the neutral position from the maximum torsion angle in the positive-side torsional region, the large hysteresis mechanism 50 is deactivated in a torsional region from the maximum torsion angle to the second torsion angle (10 degrees).

(3) When the relative rotation is performed until reaching the maximum torsion angle (25 degrees) from the neutral position in the negative-side torsional region, the large hysteresis mechanism 50 is deactivated in a torsional region from the neutral position to the third torsion angle (4 degrees).

(4) When the relative rotation is performed until reaching the neutral position from the maximum torsion angle in the negative-side torsional region, the large hysteresis mechanism 50 is deactivated in a torsional region from the maximum torsion angle to the fourth torsion angle (21 degrees).

Figure 9:
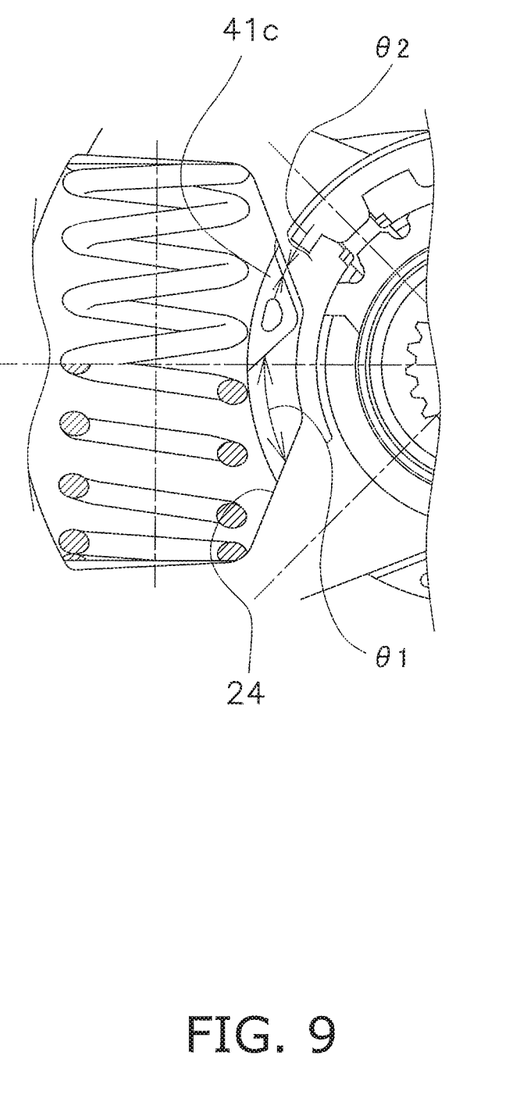
FIG. 9 is a partial enlarged view of FIG. 3.

The hysteresis inhibiting mechanism 60 is composed of circumferential gaps, each of which is produced between each contact portion 41c of the first intermediate member 41 and each cutout 24 of the spline hub 20. Specifically as shown in FIG. 9, in the neutral position, a positive-side gap of angle θ1 is produced between each contact portion 41c and one end surface of each cutout 24, whereas a negative-side gap of angle θ2 is produced between each contact portion 41c and the other end surface of each cutout 24.

When the spline hub 20 is rotated relative to the input-side plate 10, the large hysteresis mechanism 50 is not activated until either the gap of angle θ1 or that of angle θ2 becomes "0". In other words, until each contact portion 41c of the first intermediate member 41 makes contact with corresponding one of the end surfaces of each cutout 24 of the spline hub 20, relative rotation is not made not only between the second intermediate member 51 and the first bushing 15 but also between the clutch plate 12 and the first intermediate member 41. Therefore, the large hysteresis torque is not generated.

[Action]

A torque, outputted from the engine, is transmitted to the power transmission device 4 including the electric motor 3 through the damper device 1, and is then transmitted to the wheel. In the damper device 1, the torque inputted thereto from the engine is transmitted from the input-side plate 10 to the spline hub 20 through the torsion springs 30, and is outputted to the shaft of the power transmission device 4 that is spline-coupled to the spline hub 20.

In this torque transmission, the input-side plate 10 and the spline hub 20 are rotated relative to each other, and the torsion springs 30 are repeatedly compressed. On the other hand, simultaneously at this time, the small hysteresis torque and the large hysteresis torque are generated by the small hysteresis mechanism 40 and the large hysteresis mechanism 50, respectively (this will be described below in detail). As a result, torsional vibration is absorbed and attenuated in the damper device 1.

Furthermore, when the torsion angle between the input-side plate 10 and the spline hub 20 gets larger, each stopper pawl 23 of the spline hub 20 collides against each pair of coupling portions 12a and 13a of the clutch plate 12 and the retaining plate 13 in due course. Accordingly, relative rotation between the both members 10 and 20 is stopped.

[Characteristics in Positive-Side Torsional Region]

In the positive-side torsional region corresponding to a condition that a torque is inputted from the engine, the spline hub 20 is rotated relative to the input-side plate 10 to an R1 side (see FIG. 3). Torsional characteristics will be hereinafter explained with reference to the schematic diagram of FIG. 10 and a torsional characteristic diagram of FIG. 7.

<In Displacement from Neutral Position to Maximum Torsion Angle>

Figure 10:
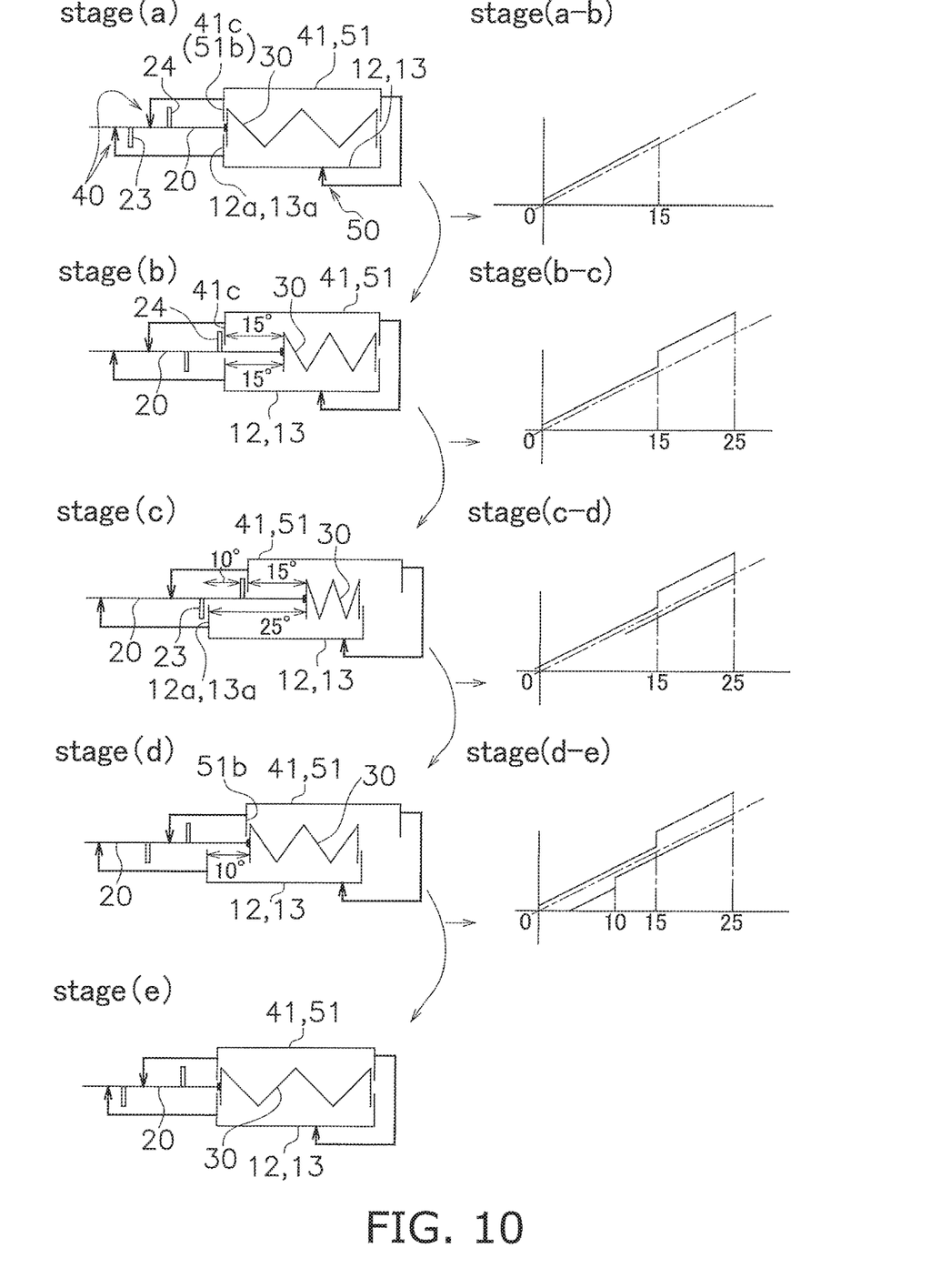
FIG. 10 is a schematic diagram for explaining actuation of the damper device.

As shown in FIG. 7 and stages (a), (b) and (a-b) of FIG. 10, in a torsional region corresponding to an angular range θ1 from the neutral position (0 degrees) to the first torsion angle (15 degrees), only the small hysteresis mechanism 40 is activated, whereby only the small hysteresis torque is generated. Specifically, until the end surface of each cutout 24 of the spline hub 20 makes contact with each contact portion 41c of the first intermediate member 41, the spline hub 20 is rotated relative to not only the clutch plate 12 and the retaining plate 13 but also the intermediate members 41 and 51. On the other hand, both the clutch plate 12 and the retaining plate 13 and the intermediate members 41 and 51 are not rotated relative to each other. Therefore, the disc portion 41b of the first intermediate member 41 and the flange 22 make contact by friction with each other, while the second bushing 42 and the flange 22 make contact by friction with each other. Accordingly, the small hysteresis torque is obtained.

As shown in FIG. 7 and stages (b), (c) and (b-c) of FIG. 10, when the torsion angle reaches the first torsion angle (15 degrees), the end surface of each cutout 24 of the spline hub 20 makes contact with each contact portion 41c of the first intermediate member 41. Because of this, in the torsional region from the first torsion angle (15 degrees) to the maximum torsion angle (25 degrees), the intermediate members 41 and 51 are rotated together with the spline hub 20. In other words, the spline hub 20 and the intermediate members 41 and 51 are rotated relative to the clutch plate 12 and the retaining plate 13. Here, the large hysteresis mechanism 50 is activated together with the small hysteresis mechanism 40. In the large hysteresis mechanism 50, the disc portion 51a of the second intermediate member 51 and the first bushing 15 make contact by friction with each other, while the clutch plate 12 and the disc portion 41b of the first intermediate member 41 make contact by friction with each other. Accordingly, the large hysteresis torque greater than the small hysteresis torque is obtained.

<In Displacement from Maximum Torsion Angle to Neutral Position>

As shown in FIG. 7 and stages (c), (d) and (c-d) of FIG. 10, in a torsional region corresponding to an angular range θ1 from the maximum torsion angle (25 degrees) to the second torsion angle (10 degrees), only the small hysteresis torque is generated. Specifically, the end surface of each cutout 24 of the spline hub 20 is separated from each contact portion 41c of the first intermediate member 41, and hence, the spline hub 20 is rotated relative to not only the clutch plate 12 and the retaining plate 13 but also the intermediate members 41 and 51, although the intermediate members 41 and 51 are not herein rotated. Therefore, the small hysteresis torque is obtained.

As shown in FIG. 7 and stages (d), (e) and (d-e) of FIG. 10, when the torsion angle reaches the second torsion angle (10 degrees), each torsion spring 30, restored to the pre-compressed state thereof, makes contact at the end surface thereof with each support portion 51b of the second intermediate member 51. Because of this, in the torsional region from the second torsion angle (10 degrees) to the neutral position, the intermediate members 41 and 51 are rotated together with the spline hub 20. In other words, the spline hub 20 and the intermediate members 41 and 51 are rotated relative to the clutch plate 12 and the retaining plate 13. Therefore, the large hysteresis torque is obtained.

According to the damper device 1 having the torsional characteristics described above, in the positive-side torsional region, only the small hysteresis torque is constantly obtained in any of the angular ranges θ1 (15 degrees). In other words, the large hysteresis mechanism 50 is not activated unless fluctuations in the torque exceed a range corresponding to a torsion angle θ1 (the deactivation angular range.) Besides, each angular range θ1, in which the small hysteresis torque is obtained, is wider than an angular range (10 degrees) in which the large hysteresis torque us obtained. Because of this, small-amplitude vibration can be effectively inhibited in normal operation, and simultaneously, drivability can be enhanced. Moreover, the large hysteresis torque is obtained before the relative rotation reaches the maximum torsion angle and in the vicinity of the neutral position. Because of this, relatively large-amplitude vibration can be effectively inhibited when the engine is started by the electric motor, when the engine is stopped, or when such vibration is inputted from the output side. Furthermore, shock can be inhibited from being applied to the stopper mechanism composed of the constituent elements 12a, 13a and 23. Yet further, when the relative rotation (displacement) is performed across the neutral position from the positive-side torsional region to the negative-side torsional region or vice versa, a portion contacted by relevant either of the end surfaces of each torsion spring 30 is configured to be switched between the both plates 12 and 13 and the flange 22. In this case, the large hysteresis torque is generated, whereby it is possible to inhibit shock occurring in switching of the contacted portions.

[Characteristics in Negative-Side Torsional Region]

Actuation made in characteristics exerted in the negative-side torsional region is basically the same as that made in the characteristics exerted in the positive-side torsional region, although angular settings for the characteristics exerted in the negative-side torsional region are only different from those for the characteristics exerted in the positive-side torsional region. Specifically, in the negative-side torsional region, the small hysteresis torque is obtained in a torsional region from the neutral position to the third torsion angle (4 degrees) and a torsional region from the maximum torsion angle (25 degrees) to the fourth torsion angle (21 degrees). On the other hand, the large hysteresis torque is obtained in a torsional region from the third torsion angle (4 degrees) to the maximum torsion angle (25 degrees) and a torsional region from the fourth torsion angle (21 degrees) to the neutral position.

Here, contrarily to the positive-side torsional region, the angular range (17 degrees), in which the large hysteresis torque is generated, is wider than the angular range θ2 (4 degrees) in which the small hysteresis torque is generated. Because of this, it is possible to effectively inhibit large-amplitude vibration inputted from the output side such as the wheel. Additionally, vibration inputted from a vibration source disposed on the output side and resonance attributed to an electric motor having a large amount of inertia can be set outside a rotational speed range normally used. Because of this, excessive torque can be inhibited from being transmitted to the input side in an operating condition normally used. Therefore, the entire drivetrain can be protected, and besides, compactness in component is enabled. Also, resonance attributed to vibration applied from the output side can be inhibited.

OTHER PREFERRED EMBODIMENTS

The present invention is not limited to the preferred embodiment described above, and a variety of changes or modifications can be made without departing from the scope of the present invention.

(a) In the aforementioned preferred embodiment, the first and second intermediate members 41 and 51 are provided as separate members. However, these members may be provided as a single member.

(b) In the aforementioned preferred embodiment, the first intermediate member 41 is provided with the contact portions 41c, whereas the flange 22 is provided with the cutouts 24. However, the first intermediate member may be provided with cutouts, whereas the flange may be provided with contact portions that are inserted into the cutouts of the first intermediate member, respectively.

(c) In the aforementioned preferred embodiment, the first intermediate member and the clutch plate are configured to directly make contact by friction with each other. However, the first intermediate member may be provided with a friction member fixed thereto, and may be configured to make contact at the friction member with the clutch plate.

(d) The magnitudes of hysteresis torques obtained by the small hysteresis mechanism and the large hysteresis mechanisms and the angular ranges in which the respective hysteresis torques are generated are exemplary only.

REFERENCE SIGNS LIST

1 Damper device
2 Engine
3 Electric motor
12 Clutch plate (first plate, input-side rotor)
13 Retaining plate (second plate, input-side rotor)
20 Spline Hub (output-side rotor)
22 Flange
24 Cutout
30 Torsion Spring (damper part)
40 Small hysteresis mechanism (second friction mechanism)
41 First intermediate member
41b Disc portion
41c Contact portion
50 Large hysteresis mechanism (first friction mechanism)
51 Second intermediate member
51a Disc portion
52 Second cone spring
60 Hysteresis inhibiting mechanism (friction control mechanism)

What is claimed is:

1. A damper device for a vehicle transmitting a torque from a drive source to an output side therethrough, the damper device comprising:
   an input-side rotor;
   an output-side rotor rotatable relative to the input-side rotor;
   a damper part adapted to elastically couple the input-side rotor and the output-side rotor in a rotational direction;
   a first friction mechanism adapted to generate a first hysteresis torque in relative rotation between the input-side rotor and the output-side rotor; and
   a friction control mechanism adapted to control actuation of the first friction mechanism, wherein
   in a positive-side torsional region in which the torque is transmitted from the drive source,
   when the relative rotation is performed until reaching a maximum torsion angle from a neutral position without the relative rotation, the friction control mechanism deactivates the first friction mechanism until the relative rotation reaches a first torsion angle from the neutral position, the friction control mechanism activating the first friction mechanism until the relative rotation reaches the maximum torsion angle from the first torsion angle, and
   when the relative rotation is performed until reaching the neutral position from the maximum torsion angle, the friction control mechanism deactivates the first friction mechanism until the relative rotation reaches a second torsion angle less than the first torsion angle from the maximum torsion angle, the friction control mechanism activating the first friction mechanism until the relative rotation reaches the neutral position from the second torsion angle.

2. The damper device according to claim 1, wherein a deactivation angular range from the neutral position to the first torsion angle and a deactivation angular range from the maximum torsion angle to the second torsion angle are equal in magnitude.

3. The damper device according to claim 2, wherein each of the deactivation angular ranges is wider than each of an activation angular range from the first torsion angle to the maximum torsion angle and an activation angular range from the second torsion angle to the neutral position.

4. The damper device according to claim 2, wherein the friction control mechanism deactivates the first friction mechanism within a range that fluctuations in the torque transmitted from the drive source correspond to the deactivation angular ranges in an entire angular range between the neutral position and the maximum torsion angle.

5. The damper device according to claim 1, further comprising:
   a second friction mechanism adapted to generate a second hysteresis torque less than the first hysteresis torque in an entire angular range in which the relative rotation between the input-side rotor and the output-side rotor is performed.

6. The damper device according to claim 1, wherein in a negative-side torsional region in which a torque is transmitted from the output side,
   when the relative rotation is performed until reaching a maximum torsion angle from the neutral position, the friction control mechanism deactivates the first friction mechanism until the relative rotation reaches a third torsion angle from the neutral position, the friction control mechanism activating the first friction mechanism until the relative rotation reaches the maximum torsion angle from the third torsion angle, and
   when the relative rotation is performed until reaching the neutral position from the maximum torsion angle, the friction control mechanism deactivates the first friction mechanism until the relative rotation reaches a fourth torsion angle greater than the third torsion angle from the maximum torsion angle, the friction control mechanism activating the first friction mechanism until the relative rotation reaches the neutral position from the fourth torsion angle.

7. The damper device according to claim 1, wherein
   the drive source is an engine, and
   an electric motor for starting the engine and driving the vehicle is disposed on the output side.

8. The damper device according to claim 1, wherein
   the input-side rotor includes a first plate and a second plate, the first and second plates disposed in axial opposition to each other at a predetermined interval, the first and second plates fixed to each other so as to be axially immovable from each other and be non-rotatable relative to each other,
   the output-side rotor includes a flange, the flange being disposed to be interposed between the first and second plates, and
   the first friction mechanism is disposed axially between the flange and at least one of the first and second plates.

9. The damper device according to claim 1, wherein the first friction mechanism includes
   a friction plate rotated together with the output-side rotor within a predetermined angular range, the friction plate capable of making contact by friction with the input-side rotor, and
   an urging member adapted to cause the friction plate and the input-side rotor to be pressed in contact with each other.

10. The damper device according to claim 9, wherein
    the friction control mechanism includes
    a cutout provided in one of the output-side rotor and the friction plate, the cutout extending within a predetermined angular range in a circumferential direction, and
    a contact portion provided in the other of the output-side rotor and the friction plate, the contact portion disposed in the cutout at a predetermined gap therefrom, and
    the friction plate is rotatable relative to the output-side rotor within a range of the predetermined gap.

11. A damper device for a vehicle transmitting a torque from a drive source to an output side therethrough, the damper device comprising:
    an input-side rotor;
    an output-side rotor rotatable relative to the input-side rotor;
    a contact member attached to the input-side rotor;
    a damper part adapted to elastically couple the input-side rotor and the output-side rotor in a rotational direction; and
    a friction mechanism adapted to generate a hysteresis torque in relative rotation between the input-side rotor and the output-side rotor, wherein
    the friction mechanism includes a first friction mechanism and a second friction mechanism, the second friction mechanism adapted to generate a second hysteresis torque, the first friction mechanism generating a first hysteresis torque greater than the second hysteresis torque,
    in a positive-side torsional region in which the torque is transmitted from the drive source, the second friction mechanism generates the second hysteresis torque within a first angular range in which the relative rotation is performed until reaching a first torsion angle from a neutral position without the relative rotation, and in the positive-side torsional region, the first friction mechanism generates the first hysteresis torque greater than the second hysteresis torque in a state where the first friction mechanism contacts the contact member and the second friction mechanism contacts the input-side rotor within a second angular range in which the relative rotation is performed until reaching a maximum torsion angle from the first torsion angle, the second angular range narrower than the first angular range.

12. The damper device according to claim 11, wherein in a negative-side torsional region in which a torque is transmitted from the output side, the second friction mechanism generates the second hysteresis torque within a third angular range in which the relative rotation is performed until reaching a third torsion angle from the neutral position, and in the negative-side torsional region in which the torque is transmitted from the output side, the first friction mechanism generates the first hysteresis torque to be greater than the second hysteresis torque within a fourth angular range in which the relative rotation is performed until reaching a maximum torsion angle from the third torsion angle, the fourth angular range wider than the third angular range.

* * * * *